Patented Mar. 27, 1923.

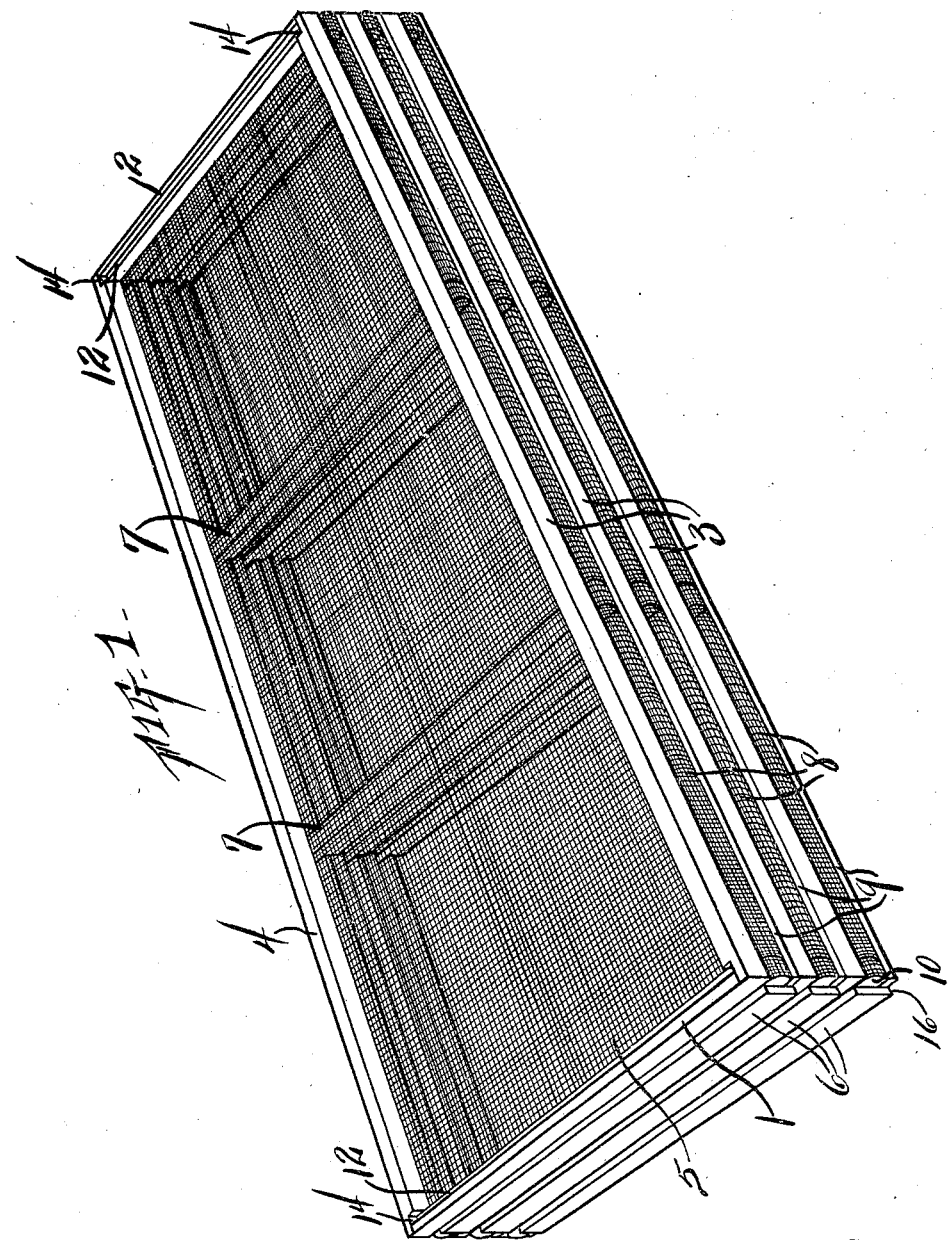

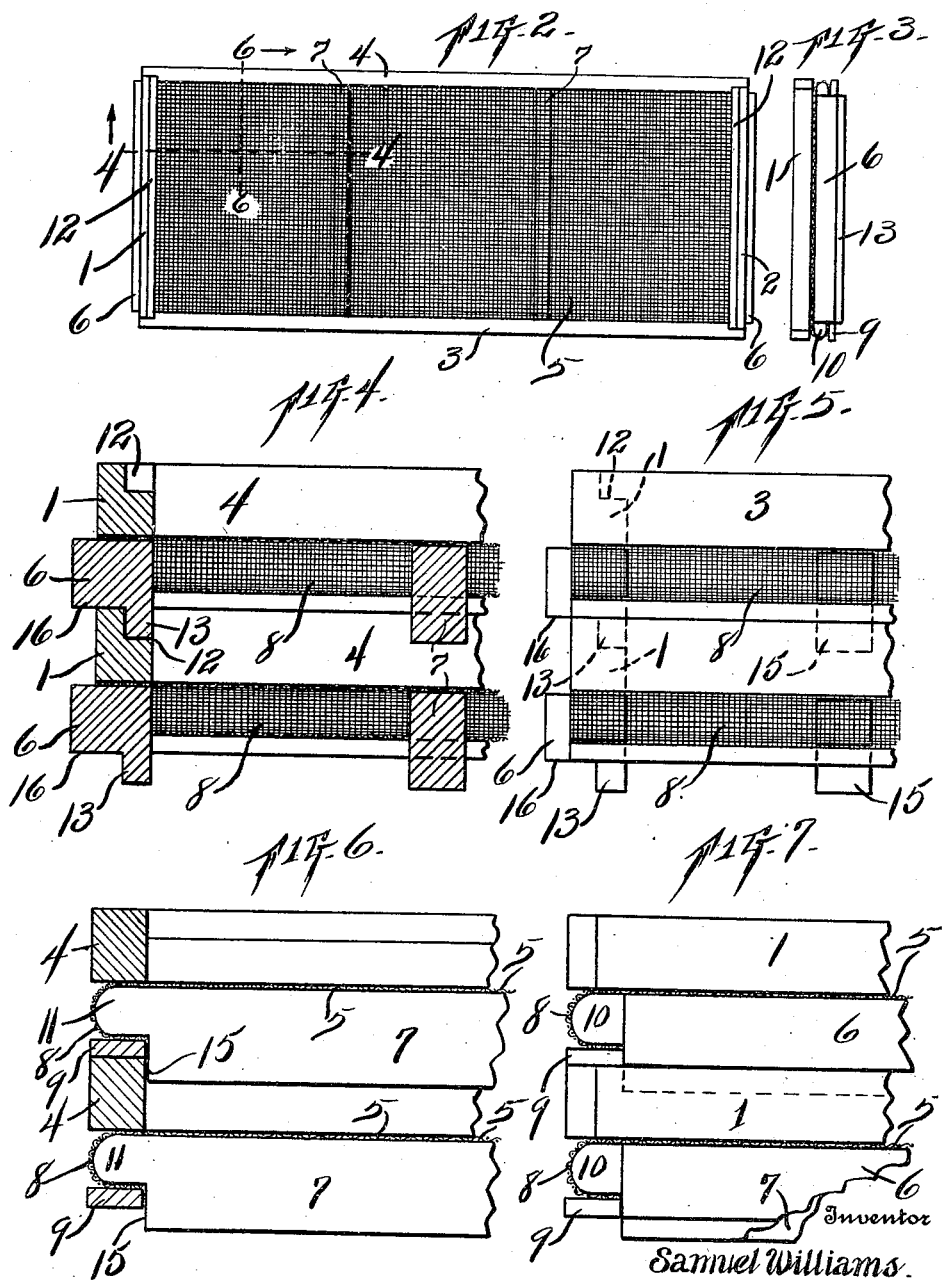

1,449,714

UNITED STATES PATENT OFFICE.

SAMUEL WILLIAMS, OF ELK CITY, OKLAHOMA.

FRUIT-DRYING APPARATUS.

Application filed April 4, 1922. Serial No. 549,578.

*To all whom it may concern:*

Be it known that I, SAMUEL WILLIAMS, a citizen of the United States, residing at Elk City, in the county of Beckham and State of Oklahoma, have invented certain new and useful Improvements in Fruit-Drying Apparatus, of which the following is a specification.

My invention relates to fruit drying apparatus and the object is to provide a simple and highly efficient apparatus which can be manufactured at a cost low enough to make the manufacture and sale and use feasible and which will be equally adaptable for the use of small productions as well as large productions. One object is to provide an apparatus which can be easily and quickly handled, as when the fruit or other goods are spread in the sunshine and a rain or storm comes. Another advantage of the improved apparatus is that it is adapted for drying fruit by natural or artificial heat, either in the sunshine or out of the sunshine. Other objects and advantages will be fully explained in the following description and the invention will be more particularly pointed out in the claims.

Reference is had to the accompanying drawings which form a part of this application.

Fig. 1 is a perspective view of the improved apparatus. Fig. 2 is a plan view on a smaller scale. Fig. 3 is an end view of one unit of the apparatus. Fig. 4 is a broken vertical sectional view on a larger scale, taken on the line 4—4 of Fig. 2. Fig. 5 is a broken side elevation of two sections. Fig. 6 is a broken vertical section of two sections of the apparatus, taken on the line 6—6 of Fig. 2. Fig. 7 is a broken end elevation of two sections.

Similar characters of reference are used to indicate the same parts throughout the several views.

The apparatus is composed of a plurality of sections nested together. A main rectangular frame has end pieces 1 and 2 and side pieces or members 3 and 4. The screen 5 is attached by nailing or tacking or otherwise to the undersides of the members 1, 2, 3, and 4 and is secured thereto by end spacing members 6 and by braces 7 intermediate the ends of the frame 7. Provision is made for ventilating the apparatus. The ends of the spacing members 6 and the ends of the braces 7 are rabbeted. The screen is extended to form side screens 8 so that air can pass between the different units. The screens 8 are secured in place by attachment to the undersides of all the members 1, 2, 3, and 4 and to the ends of the spacing members 6 and the screens 8 may also be attached to the ends of the braces 7. The screens 8 are further attached to the longitudinal members 9 and the members 9 are attached by nailing or otherwise to the ends 10 of the spacing members 6 and to the ends 11 of the braces 7, the braces 7 being attached to the members 3 and 4 of the main frame. This completes the description of one unit. All the units are duplicates.

The units are nested together by rabbeting cut-outs 12 in the upper inside edges of the members 1 and 2 of the main frame and forming depending flanges 13 on the lower inner edges of the spacing members 6. When the units are nested, the flanges 13 fit in the cut-outs 12. The ends of the side frame members 3 and 4 are slightly rabbeted at 14 to receive the flanges 13. The braces 7 have shoulders 15 which brace against the members 3 and 4. When the units are nested together, the screens 5 will be spaced apart as shown in Figs. 4 to 7 inclusive. The screens 8 will permit the necessary passage of air through the sides of the units. For convenience in handling the apparatus while the units are nested together, the spacing bars 6 are extended endwise the units to form lifting means 16. In use the operator or workman can grasp the extensions 16 for lifting the apparatus.

The side screens 8 will keep flies and other insects off of the fruit while the screens or units are nested together as well as permit the free passage of air. The fruit or other material that is being dried is spread thinly on the screen of each unit and they may be set out separately in the sunshine or nested and stacked in a shed or other building. If, while the screens are set out, it becomes necessary to move them quickly, a number of them can be nested and moved at a time.

Various changes in the sizes, construction, and arrangement of the several parts may be made without departing from my invention.

What I claim, is;—

1. A fruit drying apparatus comprising a plurality of units nested together, each unit having a rectangular frame, a screen attached to the underside of said frame, spacing bars attached to the end members of said frame and provided with reduced curved ends, said screen being extended to form side screens attached to said curved ends, longitudinal bars attached to the underside of said curved ends and securing said side screens in place, and cross-bars supported on said side screens and longitudinal bars and provided with shoulders for bracing the sides of the adjacent unit.

2. A fruit drying apparatus comprising a plurality of units to be nested together, each unit having a rectangular frame, the end members having the inner edges rabbeted to form cut-outs therein, a screen spanning said entire frame and attached to the underside thereof, spacing bars attached to the end members of said frame and securing said screen to said end members and provided with reduced curved ends, said screen being extended laterally to form side screens attached to said curved ends, longitudinal bars attached to the under sides of said curved ends and to said side screens and securing said side screens in place, and depending flanges formed on said spacing bars for engaging the cut-outs of the adjacent unit.

3. A fruit drying apparatus comprising a plurality of units adapted to be nested together, each unit having a rectangular frame with the end members having cut-outs in their upper inner sides, a screen spanning the entire frame and attached to the underside thereof, spacing bars provided with depending flanges for engaging the cut-outs of the next unit below and attached to said frame and securing said screen to the end members thereof and having the ends thereof reduced and having the exterior sides extended endwise of the frame to form lifts, said screen being extended to form side screens attached to said spacing bars, longitudinal bars attached to the ends of said spacing bars and to said side screens, cross-bars intermediate the ends of said frame having the ends reduced and attached to said longitudinal bars, and shoulders formed on and depending from said cross-bars to brace the sides of the next unit below.

In testimony whereof, I set my hand, this 30th day of March, 1922.

SAMUEL WILLIAMS.